Dec. 27, 1966    E. A. ADAMS ETAL    3,294,292
BLENDING OF GRANULAR MATERIALS
Filed Oct. 5, 1964

INVENTORS
Edward A. Adams, Wilbur F. Brown,
BY Joseph J. Jarosi and
Glenn C. Mook
Nobbe & Swope
ATTORNEYS United States Patent Office 3,294,292
Patented Dec. 27, 1966

3,294,292
BLENDING OF GRANULAR MATERIALS
Edward A. Adams, Wilbur F. Brown, Joseph J. Jarosi, and Glen C. Mook, Toledo, Ohio, assignors to Libbey-Owens-Ford Glass Company, Toledo, Ohio, a corporation of Ohio
Filed Oct. 5, 1964, Ser. No. 401,373
6 Claims. (Cl. 222—429)

This invention relates generally to the handling of granular materials, and more particularly to the storage and handling of glass batch materials in bulk form in such a manner as to deliver from the storage area batch materials having a substantially uniform particle size distribution even though the materials may be segregated according to particle size in the storage area.

In the production of glass, the basic raw materials from which the glass is made, such as sand, limestone, soda ash and salt cake, are generally stored in individual bins and then accurately weighed out and mixed in predetermined proportions as needed. The intermixed materials, known as batch, are then charged into a furnace for melting. The storage bins are generally cylindrical silos wherein the individual materials are deposited through the top as received, and are then discharged through an opening in the bottom onto a weighing and conveying system for movement to the mixers.

Due to the manner in which glass batch materials are handled, they are afforded ample opportunity to segregate according to particle size. Thus, each time the material is handled or transferred, additional segregation may take place. The most serious source of segregation, however, is in the silos in which the materials are stored immediately prior to being employed as a constituent in the glass batch. Heretofore, such segregation according to particle size has not been considered of great significance in the making of glass. It has, however, become of increasing importance as the daily output of glass making furnaces is increased. Uniform particle size distribution is believed to accelerate melting of the batch and improve the quality of the finished glass. Recently, uniformity of particle size distribution has become even more critical due to the fact that in some raw materials now proposed for use in making glass, the chemical composition varies according to particle size. Thus, in order for the composition of the batch to remain constant, the particle size distribution of the raw materials must be uniform.

In filling the storage silos, the granular materials are generally deposited from a single spout at the top of the silo, and consequently a conical surface is formed with the apex of the cone beneath the filling spout. Since the larger particles have a smaller angle of repose than the smaller particles, they tend to roll down the conical surface to the outside of the silo, while the smaller particles remain at the center to build up the apex of the cone. Upon removing material through a centrally located bottom opening in the silo, it has been found that the central core of the material in the silo moves down through the opening leaving an annular cylinder of material substantially undisturbed. This central core is, of course, the fine material which built up the apex of the cone during filling of the silo. As the core descends, an inverse cone is formed on the surface of the material so that the larger particles on the surface, due to their smaller angle of repose, roll in toward the apex of the cone and are then carried downwardly through the center of the silo and out the bottom opening. Thus, after the initial core of fine material has been removed, the discharge will consist primarily of larger particles. When it is considered that material is periodically added to replenish the supply in the silo, it is believed apparent that over a period of time, the particle size distribution of the materials withdrawn may fluctuate over a wide range. Even should the material be distributed during filling of the silo so as to avoid segregation at this stage, it will subsequently occur during emptying thereof in the conventional manner.

Therefore, it is an object of the present invention to eliminate segregation according to particle size in removing granular materials from storage bins.

Another object of the present invention is to simultaneously remove material from a plurality of areas in a storage bin and blend the material so as to achieve a substantially uniform particle size distribution in the material.

Another object of the invention is to remove granular material through a central opening in the bottom of a storage bin without initiating particle movement on the free surface of the material so as to cause resultant segregation according to particle size.

Still another object is to provide simple, inexpensive, maintenance-free equipment for converting existing storage facilities so as to prevent segregation according to particle size in granular materials discharged therefrom.

Other objects and advantages of the invention will become more apparent during the course of the following description when taken in connection with the accompanying drawings.

In the drawings, wherein like numerals are employed to designate like parts throughout the same:

Segregation of granular materials according to particle size occurs principally upon a free surface where the individual particles are able to roll as their angle of repose is exceeded, the amount of segregation occurring within the mass of material itself being very small. According to the present invention, the conditions which give rise to segregation when withdrawing material from conventional silos are eliminated and, in addition, the material is withdrawn from different areas in the silo so that even if segregation occurred during the filling thereof, the different factions of material will be blended to give a substantially uniform particle size distribution.

Figure 1:
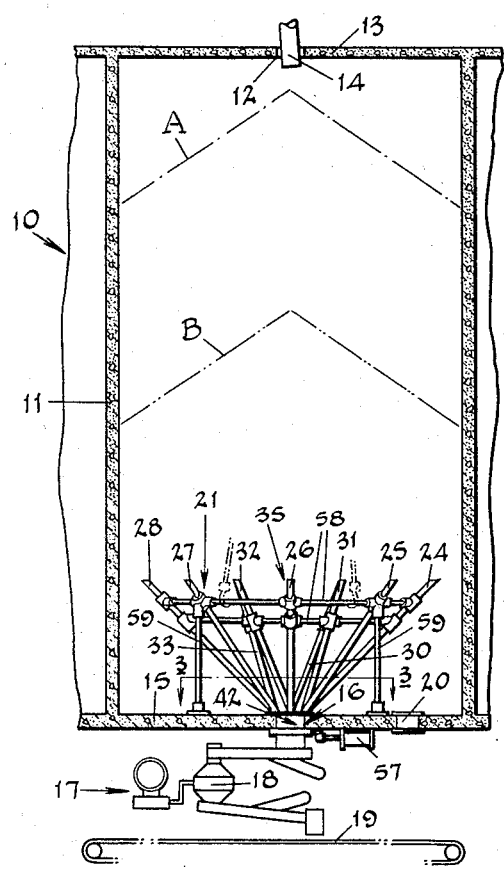
FIG. 1 is an elevational view of a silo embodying the invention.

Referring now to the drawings and in particular to FIG. 1, there is shown generally at 10 a storage facility of the type utilized for storing and dispensing glass batch ingredients. Such facilities generally include a plurality of individual silos 11, constructed of concrete, which may be 25 or 30 feet in diameter and 50 or 60 feet in height. The granular materials are elevated to the top of the silo in any suitable manner and deposited through an opening 12 in the roof or cover 13 thereof. The material is normally deposited from a single central discharge point, such as a spout 14, whereby a conical surface A is formed in the silo with resultant segregation. However, it is within the contemplation of the invention that the material may be scattered as it is deposited in the silo so as to avoid the formation of a free surface whose slope is greater than the angle of repose of any of the granular particles. Such silo filling apparatus does not constitute a part of the present invention and will not be described in detail herein.

The silos are constructed with a flat bottom or floor 15 having a central opening 16 therein through which the batch materials are discharged as needed to a weighing and conveying system shown generally at 17. The weighing and conveying system includes a weigh hopper 18 into which the material from the silo is deposited by suitable conveying equipment and accurately weighed, after which it is carried by a belt 19 and other suitable material handling equipment (not shown) to a mixer where it is combined with other ingredients to form glass batch. A second opening 20 in the floor 15 is located over the conveyor belt and spaced from the central opening for a purpose to be hereinafter more fully described.

In conventional storage silos of this type, the central opening 16 is provided with a gate by which flow through the opening is controlled. The material thus flows down along the center of the silo and through the central opening 16 as previously described. Consequently, even when the silo is nearly full, an inverted cone or depression is soon formed on the top surface of the material and segragation begins. According to the invention, there is located in the bottom of the silo a collection system shown generally at 21, which gathers material from a plurality of points over a transverse section of the silo and delivers it to the central opening 16. The collection system includes a plurality of collecting tubes or chutes 22 through 34 which radiate upwardly from the central opening and whose open upper ends 35 lie in a common plane constituting the aforementioned transverse section of the silo. At their lower ends 36, the collecting tubes are connected to a cover plate 37 over the central opening 16, the plate having openings or holes 38 therein communicating with each of the collecting tubes 22 through 34.

Figure 3:
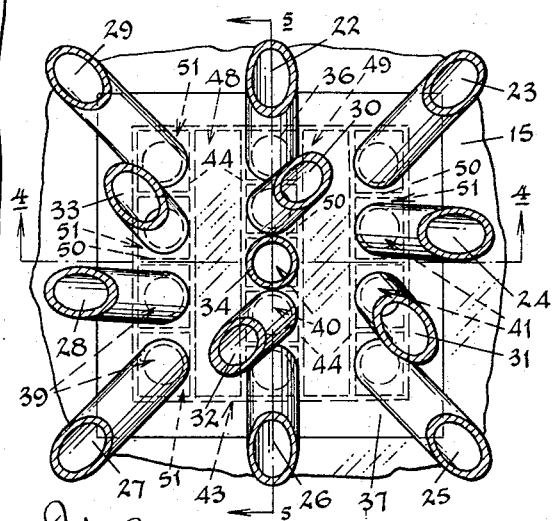
FIG. 3 is an enlarged horizontal sectional view, taken along line 3—3 of FIG. 1 and showing the feed pipes connected to the metering chamber at the bottom of the silo.
Figure 4:
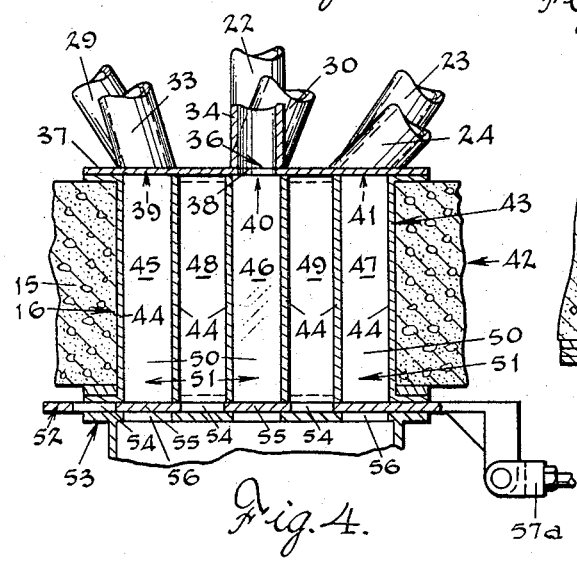
FIG. 4 is a vertical section taken along line 4—4 of FIG. 3.

Due to space limitations within the central opening 16 and in order to avoid expensive remodeling of the floor 15 of existing silos, the openings 38 are located in three parallel rows, identified at 39, 40 and 41 (FIGS. 3 and 4). A metering system 42 is located below the cover plate 37 and within the central opening 16 of the floor slab 15. The metering system comprises a box 43 set within the central opening, the box being divided by parallel walls 44 to form compartments 45, 46 and 47 beneath the rows 39, 40 and 41, respectively, of openings 38. The compartments 45 and 46 and 46 and 47 are separated by blind compartments 48 and 49, respectively. The compartments 45, 46 and 47 are further divided by walls 50 into individual chambers 51, one of the chambers being in open communication with each of the collecting tubes 22 through 34 by means of the openings 38 in the cover plate 37.

Figure 5:
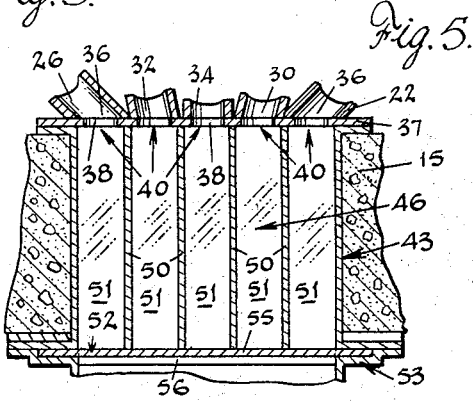
FIG. 5 is a vertical section taken along line 5—5 of FIG. 3.

Movement of material through the collecting tubes and associated chambers 51 is controlled by a valve plate 52 adapted to slide across the lower ends of the chambers between the chambers and a backing member 53 which forms channels within which the edges of the valve plate slide (FIG. 5). The valve plate contains rectangular openings 54 separated by blank spaces 55, each of the rectangular openings corresponding to one of the compartments 45, 46 and 47. Apertures 56 in the backing member correspond to the compartments 45, 46 and 47 and admit material from the compartments to the weigh hopper 18 in a manner to be described. Thus, with the valve plate positioned so that the blank spaces 55 are in registry with the bottoms of the chambers 51 as shown in FIG. 4, flow of the material in the silo through the metering system is completely cut off. As the valve plate is moved toward the right in FIG. 4, the openings 54 come into registry with the chambers 51, and material flows through the collecting tubes and chambers 51 and into the conveying system for the weigh hopper. The valve plate may be actuated in any suitable manner, such as by the plunger 57a of a hydraulic cylinder 57 or other conventional apparatus, and is preferably automatically controlled by the weigh hopper so as to stop the flow through the metering system when a predetermined amount of material has been deposited in the weigh hopper.

For a purpose to be hereinafter described, the collection system 21 rests freely upon the floor of the silo with the openings 38 in the cover plate 37 in registry with the appropriate chambers 51 of the metering system 42. The collecting tubes are interconnected by suitable bracing struts 58 and supported by legs 59. Of course, once the collection system is imbedded in the sand or other batch material, it remains stationary.

Figure 2:
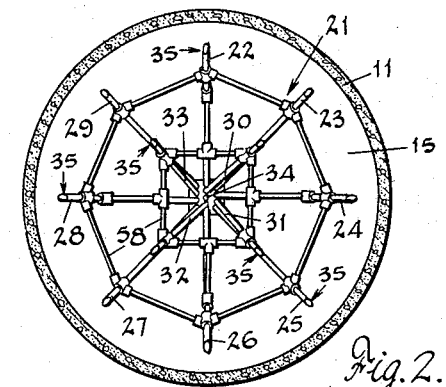
FIG. 2 is a plan view of the silo showing the location of the feed pipes.

It will be readily appreciated that the actual number and location of the collecting tubes, as well as their diameter, will depend upon a number of factors and may vary for different ratios of height to diameter in the silo and for different materials. It has been found that for a silo 25 to 30 feet in diameter and 50 to 60 feet in height, tubes of approximately 3 inches in diameter positioned as shown in FIGS. 1 and 2 will deliver glass batch materials in a satisfactory manner. The angle which the tubes make with the horizontal should be at least 45° in order to assure flow of the granular materials therethrough. The angle may be greater, of course, as indicated in the invention by the tube 34 which is vertical. The space in the silo below the open upper ends of the collecting tubes is, in effect, dead storage area since the material stored therein is not useable in normal operations. Thus, if the tubes in the outer ring, that is, the tubes 22 through 29 in FIG. 2, is unusually large, an unnecessarily large dead storage area will be created due to the greater length of tube required to achieve proper position of the open ends thereof.

Since the metering system is located beneath the collecting tubes or chutes 22 through 34, the tubes will flow full at all times when material is withdrawn through the chambers 51 and valve plate 52. Thus, the abrasive effect of the sand or other granular material on the tubes is minimized. Each collecting tube empties into a separate chamber 51, and the valve plate 52 is so constructed that upon movement of the rectangular openings into at least partial registry with the chambers and apertures 56 in the backing member 53, withdrawal of granular material through each of the chambers is equal. Thus, equal amounts of granular material are withdrawn from the silo through the open upper end of each of the collection tubes 22 through 34. As a result, the material within the silo can be drawn down until its upper surface is below the midpoint of the silo, that is, until the silo is less than half filled without causing any movement of the material upon its free upper surface. Thus, as indicated in FIG. 1 the level in the silo can be drawn down from the position shown at A to that shown at B without disturbing the surface. As previously stated, with a conventional single discharge point, a depression or inverted cone is formed on the upper surface above the discharge point even when the silo is nearly full. This causes surface movement and subsequent segregation. In normal operations, such silos are periodically refilled during use to maintain an adequate reserve for emergency situations, and are seldom if ever allowed to fall below the half-filled point. Since the invention prevents the formation of depressions in the upper surface under all normal operating conditions, it effectively prevents segregation according to particle size in withdrawing material from the silo.

In the invention, the fact that the upper surface of the material in the silo descends in a substantially undisturbed manner as the material is withdrawn from the bottom is due to the fact that the collecting tubes withdraw equal amounts of material at a plurality of points distributed over a horizontal section of the silo. In other words, the collecting tubes remove the material substantially uniformly over an entire horizontal section of the silo. Thus, even if the material should be deposited in the silo in such a manner that segregation occurred, it will be withdrawn in substantially its original proportions and subsequently blended during mixing so as to give a homogeneous material. Likewise, should the silo be drawn down well below the midpoint so that depressions begin to form above each collecting tube, the depressions will be relatively small and will soon overlap so that material will be withdrawn substantially over an entire cross section of the silo.

Periodically it is desirable to completely empty the silo for cleaning. The second opening 20 is provided for this purpose. The material is drawn down to the level of the open upper ends of the collecting tubes through the collection system 21, and then material is withdrawn through the opening 20. As previously described, the opening 20 is located over the conveyor belt 19, and the weigh hopper 18 is constructed so that it can be moved from beneath the central opening 16 to receive the material from the secondary opening. Of course, a certain amount of the material remote from the openings will have to be removed manually. For this purpose, the hooks shown in broken lines in FIG. 1 may be secured to the bracing struts 58 of the collection system so that it can be lifted from above by the cables of a winch (not shown) when the batch material will no longer flow through the opening 20. This provides access to the central opening 16 and simplifies manual cleaning.

Some silos in which it is desired to install the invention may not be provided with the second opening 20. In a collection system for such silos, the vertical central collecting tube 34 may be attached to the cover plate 37 in such a manner that it can be lifted upwardly independently of the cover plate and collecting tubes 22 through 33. Thus, after the material is drawn down to the open upper ends of the collecting tubes, the tube 34 is raised upwardly from the cover plate as by attaching the cable of the aforementioned winch thereto. By utilizing the chamber 51 from which the collecting tube 34 is disconnected, the material can be drawn down to expose the remainder of the collection system sufficiently so that it can be raised in the usual manner. The remaining material can then be manually removed through the central opening.

It is to be understood that the form of the invention herewith shown and described is to be taken as an illustrative embodiment only of the same, and that various changes in the shape, size and arrangement of parts, as well as various procedural changes may be restorted to without departing from the spirit of the invention.

We claim:

1. Apparatus for removing granular material through a central opening in the floor of a cylindrical storage silo without disturbing the free upper surface of said material, comprising a plurality of tubes extending upwardly from said central opening, the lower ends of the tubes being joined to a cover plate over said opening, a hole in said cover plate communicating with each said tube, the upper ends of said tubes being open for receiving granular material, said open upper ends lying in a common plane and being substantially uniformly distributed over a cross section of the silo, bracing members interconnecting said tubes, a metering system comprising a box in said central opening beneath said cover plate, said box being divided by parallel walls into spaced compartments with a blind compartment between each pair of spaced compartments, said spaced compartments being divided by walls into a plurality of chambers, each of said chambers being in communication with one of said tubes through said cover plate, a valve plate in sliding engagement with the lower ends of said chambers, said valve plate having openings therein corresponding to said spaced compartments and blank spaces associated therewith adapted to close off said chambers, and means for sliding said valve plate between the closed position and a position wherein the openings in said valve plate are at least in partial registry with said chambers whereby equal amounts of granular material are discharged through each of said chambers.

2. Apparatus for preventing segregation according to particle size in removing granular material through a relatively small central opening in the floor of a storage bin, comprising a collection system in the bottom of said storage bin including collecting tubes for gathering granular material from a plurality of points distributed over a cross section of said bin, and a metering system for receiving the granular materials from said collection system and controlling the rate of flow of said granular materials, said metering system comprising a separate chamber for receiving granular material from each of said collecting tubes, and means for regulating the discharge of all of said chambers simultaneously.

3. Apparatus for removing granular material through an opening in the bottom of a storage bin as claimed in claim 2, wherein said means for regulating the discharge of all of said chambers comprises a valve plate adapted to permit simultaneous discharge of granular material from each of said chambers at an equal rate.

4. Apparatus for preventing segregation according to particle size in removing granular material through a relatively small central opening in the floor of a storage bin, comprising a collection system in the lower portion of said storage bin including a plurality of collecting tubes through which granular material flows from a plurality of points distributed over a cross section of said bin, and a metering system into which the granular material flows from the collecting tubes, said metering system including a separate chamber for receiving granular material from each of said collecting tubes, and means regulating the discharge from all of said chambers simultaneously so as to withdraw the material substantially uniformly across said cross section of said bin whereby the free upper surface of the granular material descends in an undisturbed manner.

5. Apparatus for preventing segregation according to particle size in removing granular material from a storage bin as claimed in claim 4, in which said collecting tubes radiate upwardly from an opening in the bottom of said bin, the upper ends of said collecting tubes being open, and said open upper ends lying in a common plane.

6. Apparatus for preventing segregation according to particle size in removing granular material from a storage bin as claimed in claim 5, in which the outermost of said collecting tubes makes an angle of at least 45° with the horizontal whereby the granular material flows freely through all of said tubes due to gravity.

References Cited by the Examiner

UNITED STATES PATENTS

| | | | |
|---|---|---|---|
| 1,139,269 | 5/1915 | Goodman et al. | 222—429 |
| 1,686,077 | 10/1928 | Evans | 222—1 |
| 1,960,797 | 5/1934 | Sackett. | |
| 2,079,802 | 5/1937 | Hauk. | |
| 2,856,106 | 10/1958 | Madsen | 222—559 X |
| 2,857,082 | 10/1958 | Perkins | 222—485 X |
| 3,062,408 | 11/1962 | Boudan | 222—55 |
| 3,094,243 | 6/1963 | Haugen | 222—464 X |
| 3,181,739 | 5/1965 | Dye | 222—485 X |
| 3,201,010 | 8/1965 | Werner | 222—464 |

RAPHAEL M. LUPO, *Primary Examiner.*